(12) United States Patent
Pecen

(10) Patent No.: US 7,813,321 B2
(45) Date of Patent: Oct. 12, 2010

(54) APPARATUS, AND ASSOCIATED METHOD, FOR PROVIDING NETWORK SELECTION MANAGEMENT IN A RADIO COMMUNICATION SYSTEM

(75) Inventor: Mark Pecen, Waterloo (CA)

(73) Assignee: Research In Motion Limited, Waterloo (CA)

( * ) Notice: Subject to any disclaimer, the term of this patent is extended or adjusted under 35 U.S.C. 154(b) by 787 days.

(21) Appl. No.: 11/355,580

(22) Filed: Feb. 16, 2006

(65) Prior Publication Data

US 2007/0189161 A1 Aug. 16, 2007

(51) Int. Cl.
*H04B 7/216* (2006.01)
*H04W 36/00* (2009.01)
*H04W 4/00* (2009.01)

(52) U.S. Cl. .................. 370/332; 370/335; 455/436
(58) Field of Classification Search .................. 370/335, 370/331, 332; 455/436
See application file for complete search history.

(56) References Cited

U.S. PATENT DOCUMENTS

| 5,722,072 | A | 2/1998 | Crichton et al. |
| 6,141,554 | A | 10/2000 | Choi |
| 6,477,162 | B1 | 11/2002 | Bayley et al. |
| 2003/0108009 | A1* | 6/2003 | Petersen ...................... 370/332 |
| 2004/0092233 | A1* | 5/2004 | Rudrapatna .................. 455/69 |
| 2004/0097230 | A1* | 5/2004 | Natarajan et al. ........... 455/436 |
| 2004/0114553 | A1* | 6/2004 | Jiang et al. .................. 370/328 |
| 2004/0233840 | A1* | 11/2004 | Bye ........................... 370/210 |
| 2006/0291415 | A1* | 12/2006 | Xu ............................. 370/331 |

FOREIGN PATENT DOCUMENTS

EP  1424862 A1  11/2003

* cited by examiner

*Primary Examiner*—Alpus H Hsu
*Assistant Examiner*—Saad Hassan

(57) ABSTRACT

Apparatus, and an associated method, for selecting whether to authorize connection of a mobile station to communicate by way of a communication network. Radio frequency uncertainty, such as at coverage area boundaries, is managed to control better the selection. Signals broadcast by the communication system are monitored and signal performance metrics of the signals are identified. Average values of the performance metrics are identified, and rates of change of the performance metrics are calculated. When the average values are beyond a selected threshold and the rates of change are positive, authorization is granted to permit the connection of the mobile station to the communication network.

12 Claims, 4 Drawing Sheets

APPARATUS, AND ASSOCIATED METHOD, FOR PROVIDING NETWORK SELECTION MANAGEMENT IN A RADIO COMMUNICATION SYSTEM

The present invention relates generally to mobile-network attachment operations by which a mobile station is attached in communication connectivity with a communication network. More particularly, the present invention relates to an apparatus, and an associated method, for selecting whether to permit attachment of a mobile station to a communication network in an environment that exhibits uncertain radio frequency characteristics.

Improved selection management is provided as selection is made using measurements of communication-network signal broadcasts and a quantified measure of the uncertainty of the radio frequency characteristics.

BACKGROUND OF THE INVENTION

The use of mobile communication systems through which to communicate both voice and non-voice data is increasingly pervasive throughout modern society. Successive generations of mobile communication systems have been developed and deployed. Each successive generation of communication systems has, in general, provided improved, and increased numbers of types of, communication services. For instance, an exemplary, second-generation cellular communication system that provides for code division communication techniques is referred to as a CDMA (Code Division, Multiple-Access) 1× communication system. A CDMA 1× communication system provides for both voice and data communication services. A successor system, referred to as EVDO (Evolution-Data Optimized) also provides for data communication services, but provides for the communication of data at significantly higher data throughput rates.

Backward compatibility is sometimes provided in successor-generation communication systems. That is to say, a mobile station operable in a successor-communication system is sometimes also operable in a corresponding, prior-generation communication system. For instance, a mobile station operable to communicate in a communication system that provides for EVDO sometimes also is constructed to be capable of operation in a CDMA 1× communication system. Generally, due to the communication advantages of a successor-generation network, communications are preferred to be carried out by way of the successor-generation system, if available. If communications are available with the prior-generation communication system but not with the successor-generation system, then communications are effectuable with the prior-generation system due to the backward compatibility of the mobile station.

The coverage areas of the communication networks of different communication systems, such as prior-generation and successor-generation communication systems of the same technology types, are regularly overlaid, or partially overlaid, upon one another. A mobile station, as a result, is sometimes positioned at a location within the coverage areas of two or more communication systems, permitting selection to be made of with which of the available communication systems through which to communicate. And, due to the mobility of the mobile station, the mobile station is subsequently repositionable elsewhere, such as at a location encompassed by the coverage area of the networks of a different number of communication systems. Additionally, a coverage area, such as a cellular coverage area, is not constant, but, instead, is variable, dependent upon, e.g., radio frequency conditions. Such variation in coverage area is sometimes referred to as cell breathing.

Selection of which communication system through which to communicate, therefore, cannot be made based merely upon the location of the mobile station. Analysis of the radio frequency characteristics associated with the available communication systems is required. However, particularly when the mobile station is positioned close to a boundary area at which the cell breathing effects are most noticeable, the selection of communication system through which to communicate is particularly difficult. Existing manners by which to make selection generally do not adequately take into account the uncertainty associated with the radio frequency, communication conditions of a communication system.

An improved manner of making selection of whether to permit communication of a mobile station with a communication system is therefore required.

It is in light of this background information related to communications in a radio communication system that the significant improvements of the present invention have evolved.

DETAILED DESCRIPTION

Figure 1:
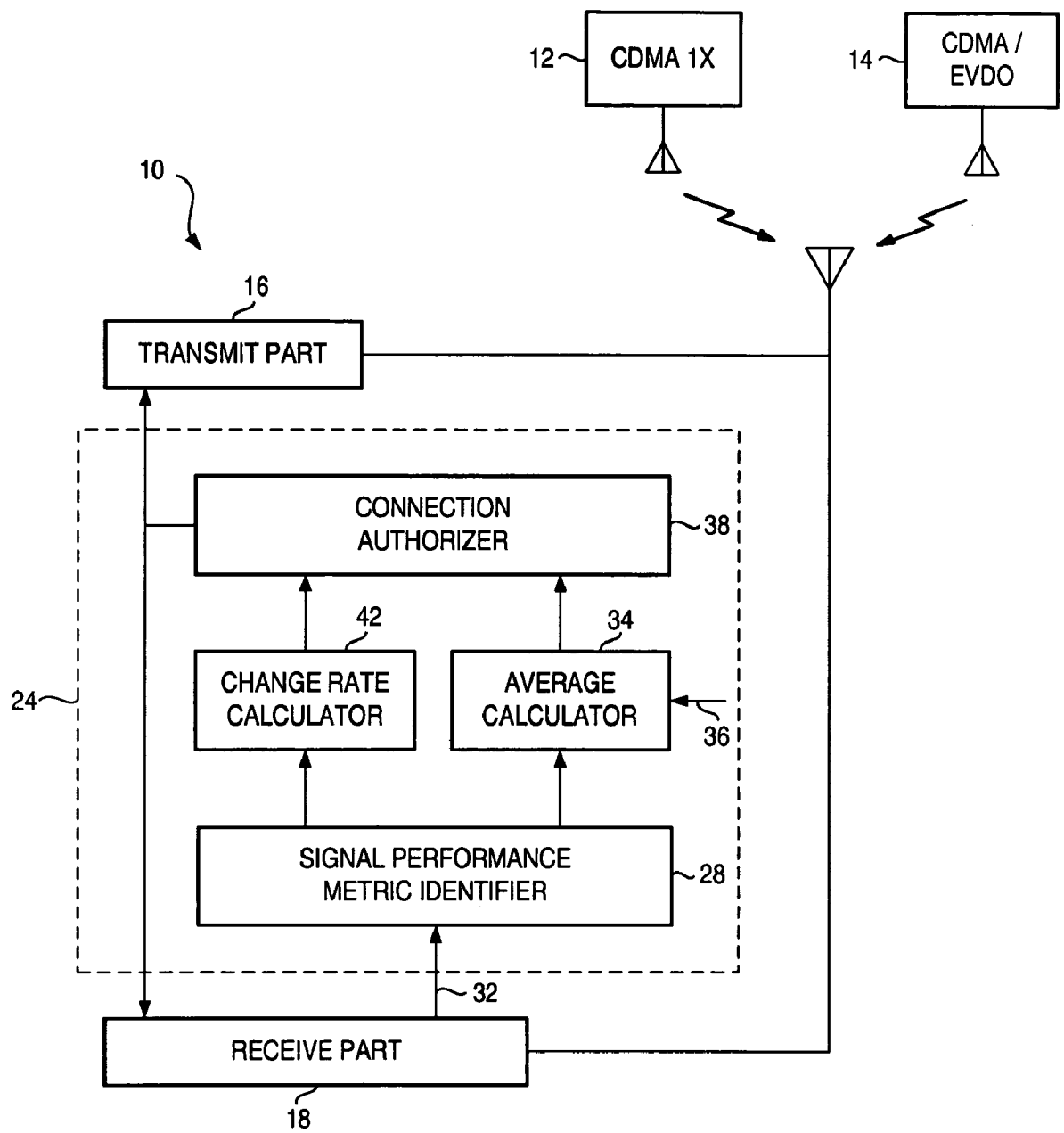
FIG. 1 illustrates a functional block diagram of a communication system in which an embodiment of the present invention is operable.

The present invention, accordingly, advantageously provides apparatus, and an associated method, for selecting whether to permit mobile-network attachment operations by which a mobile station is attached in communication connectivity with a communication network.

Through operation of an embodiment of the present invention, a manner is provided by which to select whether to permit attachment of a mobile station to a communication network in an environment that exhibits uncertain radio frequency characteristics.

In operation, improved selection management is provided as selection is made using measurements of communication-network signal broadcasts and a quantified measure of the uncertainty of the radio frequency characteristics.

In one aspect of the present invention, selection of a communication system in the presence of high uncertainty of radio frequency characteristics is managed. Radio frequency measurements are accumulated, and the degree of uncertainty of the radio frequency characteristics is quantified. Then, a decision threshold is created based upon the quantified uncertainty characteristics.

In another aspect of the present invention, the mobile station monitors broadcasts of signals generated by a potential target cell site, or other network-station that broadcasts signals. The signals are of values that permit determination of a signal performance metric. The signals form a signal performance metric identifier that identifies a signal performance metric. The signal performance metric is representative of a radio frequency characteristic associated with communication conditions of the communication channel upon which the signals are broadcast. The signals are operated upon, for instance, to obtain the signal performance metric. The signal performance metric forms, for instance, a signal strength indication, such as an RSSI value, a bit error rate (BER) value, a bit error probability (BEP) value, a carrier-to-interference (C/I) value, or any other desired performance metric value or calculation that provides an indication of the radio frequency characteristics of the communication of the signals broadcast by the communication system.

The signals are monitored, for instance, during a selected number of time periods, thereby permitting accumulation of measurements of the radio frequency characteristics.

In another aspect of the present invention, rates of change of the signal performance metric are also calculated. Calculations are made, for instance, by determining differences between the values of the signal performance metric at successive time periods during which the signals are monitored. The differences between the values at the successive time periods define a delta, i.e., change between the measured values. By performing a limit operation as the time period approaches zero, the difference calculations form first derivatives of the measurements. The rates of change of the measured values are alternately calculated in other manners.

In another aspect of the present invention, the values that are accumulated over a plurality of time periods are averaged together to form an average value of the measurements over the plurality of time periods. The average value is, for instance, an arithmetic mean or a weighted average.

In another aspect of the present invention, the measured values and rates of change thereof are analyzed to select whether to authorize connection of a mobile station to the communication system from which the monitored signals are broadcast. The authorization is granted only if the measured values are of selected characteristics. The values must, for instance, exhibit an average value that is at least as great as a selected threshold. Or, the rates of change of the measured values during each of the time periods must be beyond a selected level, e.g., all of the rates of change must be positive values. In one embodiment, the authorization is granted only if the average value is beyond the selected threshold and all of the rates of change are positive.

By accumulating the measured values, temporal variations have lessened significance in the selection of whether to authorize connection of the mobile station in communication connectivity with the communication system. And, by requiring that the rates of change be positive values, further quantification of the degree of uncertainty of the radio frequency characteristics is made. By requiring that the rates of change be positive, the mobile station is likely to be traveling in a direction in which improved radio frequency characteristics shall continue to be exhibited.

In one implementation, a mobile station is operable in both a CDMA 1× and an EVDO communication system. If the mobile station is initially connected to the CDMA 1× system, the mobile station monitors for broadcasts of other systems, such as a CDMA system that provides EVDO. When a signal broadcast by a CDMA/EVDO communication system is detected, the signal is monitored over successive time periods. Averages are made of the measured values during successive time periods, and rates of change of the values are calculated. If the average value is at least as great as a selected value and the rates of change are all positive, then authorization is granted for the mobile station to switch to the EVDO system, that is, authorization is granted to permit the mobile station to become connected in communication connectivity with the CDMA/EVDO system. A manner of managing the selection of the communication system is provided even in the presence of high uncertainty of radio frequency characteristics. As the uncertainty characteristics are quantified, a better informed selection is made.

In these and other aspects, therefore, apparatus, and an associated method, is provided for a mobile station. The mobile station is selectably connectable in communication connectivity with a communication network. A signal performance metric identifier is adapted to receive an indication of a receive signal transmitted by the communication network during at least a first time period. A rate of change calculator is adapted to receive a representation of the indication received by the signal performance metric identifier. The rate of change calculator is configured to calculate a rate of change of the representation. A connector authorizer is adapted to receive an indication of calculations made by the rate of change calculator. The connector authorizer is configured selectably to authorize connection of the mobile station to the communication network responsive to the rate of change being beyond a selected threshold.

Turning first to FIG. 1, a mobile station 10 is operable to connect in communication connectivity with a selected communication system, of which portions of the networks of two communication systems, system 12 and system 14, are represented in the figure. In the exemplary implementation, the mobile station forms a CDMA-capable device operable pursuant to the operating protocol set forth in a CDMA 1× communication system and a CDMA/EVDO communication system. And, here, the communication system 12 is representative of a CDMA 1× communication system, and the communication system 14 is representative of a CDMA/EVDO communication system. More generally, the mobile station 10 is representative of any of various cellular, and other, communication station operable to communicate in a radio communication system, and the communication systems 12 and 14 are representative of any corresponding set of communication systems with which the station 10 is capable of communication. While the following description shall describe exemplary operation with respect to the exemplary implementation of the mobile station as a CDMA-capable mobile station, it should be understood that the teachings of the present invention are analogously applicable to mobile stations operable pursuant to other operating protocols, connectable to communication networks of other types of communication systems.

The mobile station includes transceiver circuitry, here represented by a transmit part 16 and a receive part 18. The transmit and receive parts operate to transmit and to receive, respectively, communication signals with a communication system, such as the systems 12 and 14, with which the mobile station is in communication connectivity.

As mentioned previously, when the mobile station is capable of EVDO communications, communications with an EVDO-capable system are generally preferred over communications in a communication system that provides only for communications conforming to CDMA 1× protocols. In the event that the EVDO system is unavailable or if communication conditions with the EVDO system are poor, communications with the CDMA 1× system are preferred. That is to say, with respect to the illustration of FIG. 1, when the mobile station 10 is positioned in the coverage areas of both the systems 12 and 14, attachment of the mobile station in communication connectivity with the EVDO system 14 is preferred over communications with the CDMA 1× system 12. But, if the communications with the communication system 14 are poor, such as sometimes exhibited when the mobile station is positioned at, or close to, a boundary of the coverage area of the communication system 14, communications are better effectuated using the CDMA 1× system. If communication conditions with the EVDO system are poor, communication errors limit the usefulness of EVDO communications in spite of the significantly higher data communication rates that are permitted therein. Communication conditions, however, are not static, particularly close to a coverage area boundary. So-called cell breathing causes the radio frequency characteristics of communications with the communication system to vary, sometimes significantly. Even when the mobile station is static, the radio frequency characteristics thereabout, as a result, are susceptible to change. And, when the mobile station moves, the change in the radio frequency characteristics of communication conditions with the communication system are susceptible to even more significant change. Selection of whether to permit attachment of the mobile station to the EVDO system, or, more generally, a particular communication system, is sometimes difficult due to the uncertainty of the radio frequency characteristics.

The mobile station 10 includes apparatus, shown generally at 24, of an embodiment of the present invention. The apparatus manages uncertainty in system selection, thereby to improve the selection process by which to select whether to permit the mobile station to become attached to, in communication connectivity, a cellular system, such as the EVDO system 14 shown in FIG. 1. The apparatus is functionally represented, implementable in any desired manner including, for instance, algorithms executable by processing circuitry. And, while the apparatus 24 is, in the exemplary implementation, embodied at the mobile station 10, in other implementations, elements of the apparatus are embodied elsewhere, e.g., at a network portion of the communication system or distributed between the network portion and the mobile station. While the uncertainty of the radio frequency characteristics cannot be altered, a manner is provided, through operation of an embodiment of the present invention, by which to manage better the uncertainty, thereby to facilitate better selection of whether to permit attachment of the mobile station to a communication system.

The apparatus includes a signal performance metric identifier 28 that is provided, here by way of the line, 32 with indications of signals received at the mobile station. The signals of interest comprise, e.g., control signals broadcast by the communication systems. The signals are monitored, in conventional manner, during operation of the mobile station, such as by tuning to code-division channels associated with the networks of the communication systems. The signal performance metric identifier identifies a performance metric associated with the received signal. For example, the performance metric forms an RSSI (Receive Signal Strength Indication) of the receive signal, a receive signal quality indication derived, e.g., from a bit error probability (BEP), a carrier-to-interference (C/I) ratio, or other communication performance indicia. In the exemplary implementation, the signal performance metric identifier identifies a value of the performance metric repeatedly during successive time intervals and accumulates the values, such as at a buffer or other storage element (not separately shown).

The values identified or formed by the identifier are provided to an average calculator 34. The average calculator calculates average values, over a selected number of time periods, to form an average value therefrom. In one implementation, the average value forms an arithmetic average. In another implementation, the average value is a weighted average. Here, weighting information is provided by way of the line 36 to weight, for instance, certain of the values that are being averaged theretogether. The average value, once calculated, is provided to a connector authorizer 38.

The values of the performance metric identified by the identifier are also provided to a change rate calculator 42. The change rate calculator calculates the rates of change of the values. The rates of change define the first derivatives of the values. In one implementation, the rates of change are calculated by forming differences between the values measured at the successive time periods. Once calculated, the rates of change are provided to the connector authorizer 38.

The connector authorizer selects whether to permit the mobile station to become attached to the communication system responsive to the values provided thereto by the average calculator and the change rate calculator. In various implementations, the authorization is further dependent upon other criteria, including conventional criteria. Authorizations provided by the authorizer are provided to the transceiver circuitry, and the transmit and receive parts 16 and 18 are caused to be operated in manners to carry out the authorization provided by the connector authorizer.

In the exemplary implementation, the connector authorizer authorizes attachment of the mobile station to the communication system when the average value is beyond a selected threshold and the rates of change are positive.

That is to say, in operation of an exemplary embodiment, N measurements are accumulated at fixed intervals. The measurements permit metrics of radio frequency performance to be identified of signals received at the mobile station, here of a neighboring system, the system 14. Upon the accumulation of the N measurements, and for each measurement period thereafter, the window(s) of measurements are processed. First, an arithmetic or weighted average of measurements is computed. Then, the first derivative of each measurement is computed.

Authorization to connect with the system is permitted only if the computed average is greater than or equal to a threshold level and also the first derivative of the measurements within the sliding window, less the first measurement is positive. This ensures that the uncertainty level with respect to the radio frequency characteristics has diminished to a degree where a relatively high likelihood exists that the mobile station shall be able to remain attached in communication connectivity to the communication system.

Mathematically, a selection parameter of an alternate system, $\hat{S}$, such as the system 12 or 14 shown in FIG. 1, is represented as follows:

$$\hat{S} = \left\{ \overline{m} = \sum_{i=1}^{N} w_i m_i \geq T_s \wedge \forall \; \frac{dm_i}{dm_{i-1}} > 0 : \text{TRUE} \right.$$

Alternatively $$\hat{S} = \left\{ \overline{m} = \sum_{i=1}^{N} w_i m_i \geq T_s \wedge \forall \; \frac{dm_i}{dm_{i-1}} > 0 \wedge \forall \; \frac{dm_i}{dm_{i-1}} \geq T_D : \text{TRUE} \right.$$

Figure 2:
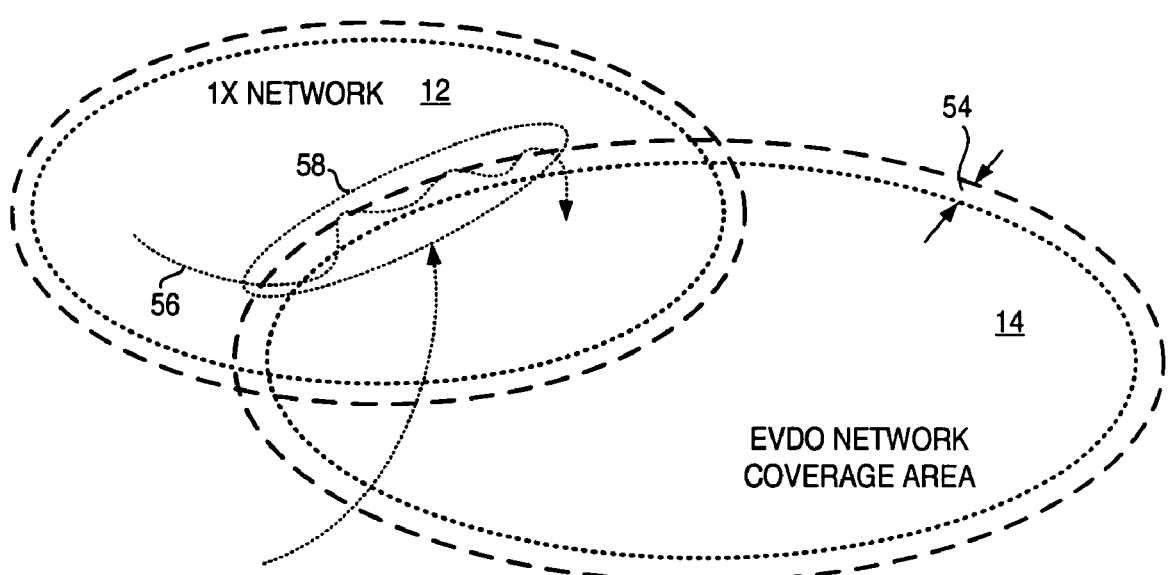
FIG. 2 illustrates a representation of coverage areas of a set of communication systems with which a mobile station operable pursuant to an embodiment of the present invention is selectably capable of communicating.

Where:
$\hat{S}$=Selection parameter of alternate system: Boolean
$\overline{m}$=Average of all received measurements in window of N measurements
$w_i$=Weight assigned to measurement at position "i"
$m_i$=Value of measurement at position "i"
$T_s$=Threshold of average for selection of alternate system
$T_D$=Threshold of derivative for selection of alternate system FIG. 2 illustrates a representation, shown generally at 52, of exemplary coverage areas of the networks of the communication systems 12 and 14, shown in FIG. 1. The coverage areas partially overlap. And, the cell-breathing effect, evident most significantly at the boundaries of the coverage areas are shown, represented by the dashed lines and solid lines, and the differences 54 therebetween.

An exemplary path of travel of the mobile station is represented by the line 56. Initially, the mobile station is in the area of solid coverage of the network of the CDMA 1× system 12. The mobile station is attached to the system 12 when so-positioned. Subsequently, the mobile station travels into the area 58 at the boundary area of the network of the EVDO system 14. Radio frequency characteristics thereat are uncertain as a result, e.g., of fading channel conditions, user mobility, and instantaneous cell breathing. When so-positioned, the mobile station is unable fully to synchronize itself with the EVDO system and, in the absence of operation of an embodiment of the present invention, falls back to attachment to the system 12 repeatedly, thereby causing incomplete access to information communicated during operation of the system 12. And, subsequently, the mobile station enters into the solid coverage area of the system 14. The mobile station attaches to the system 12 as little uncertainty regards the appropriateness of the radio frequency characteristics of communication conditions in the system 14.

Through operation of an embodiment of the present invention, the mobile station does not attempt to become attached to the system 14 when the mobile station is positioned at the area 58. The performance metrics do not exhibit the required average values or exhibit positive rates of change, required to permit attachment of the mobile station to the EVDO system. As the mobile station enters into the area of solid coverage of the EVDO system, the performance metric changes, and the attachment of the mobile station to the system 14 is permitted.

Figure 3:
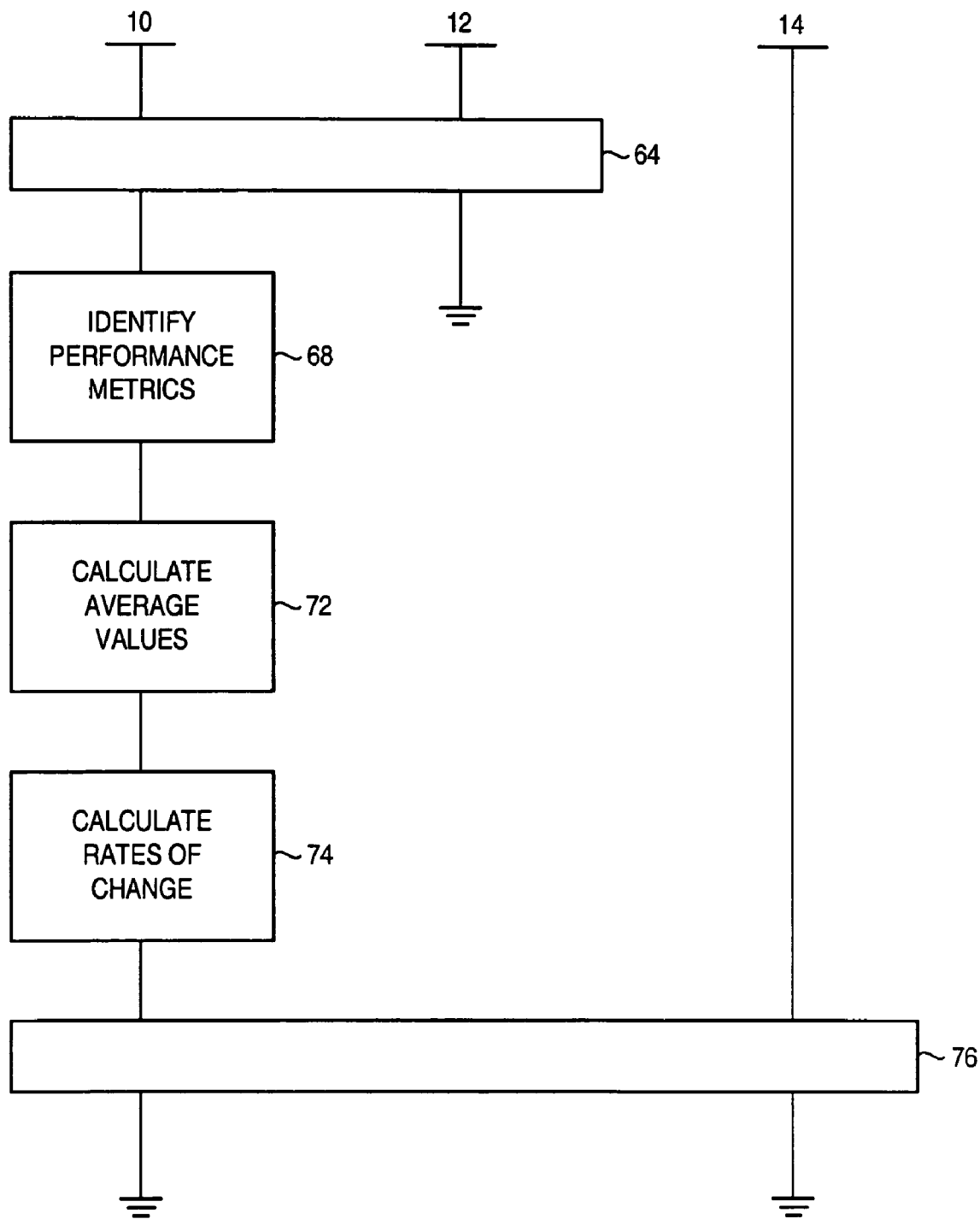
FIG. 3 illustrates a message sequence diagram representative of signaling generated during operation of the communication system shown in FIG. 1.

FIG. 3 illustrates a sequence representation 62 of operation of the mobile station 10. Here, initially, the mobile station is attached in communication connectivity, indicated by the block 64, with the communication system 12. The mobile station monitors signals broadcast by the communication system 14. Signal performance metrics are identified by measurement of the signals broadcast by the system 14 during a plurality of time periods. Performance metrics of the signal are identified, here indicated by the block 68 values of which are averaged and rates of change thereof are calculated, indicated by the blocks 72 and 74. If both the rates of change are positive and the average values are greater than a selected threshold, authorization is granted, indicated by the block 76 for the mobile station to become attached to the communication system 14. And, the mobile station becomes attached, indicated by the block 76, with the system 14.

Figure 4:
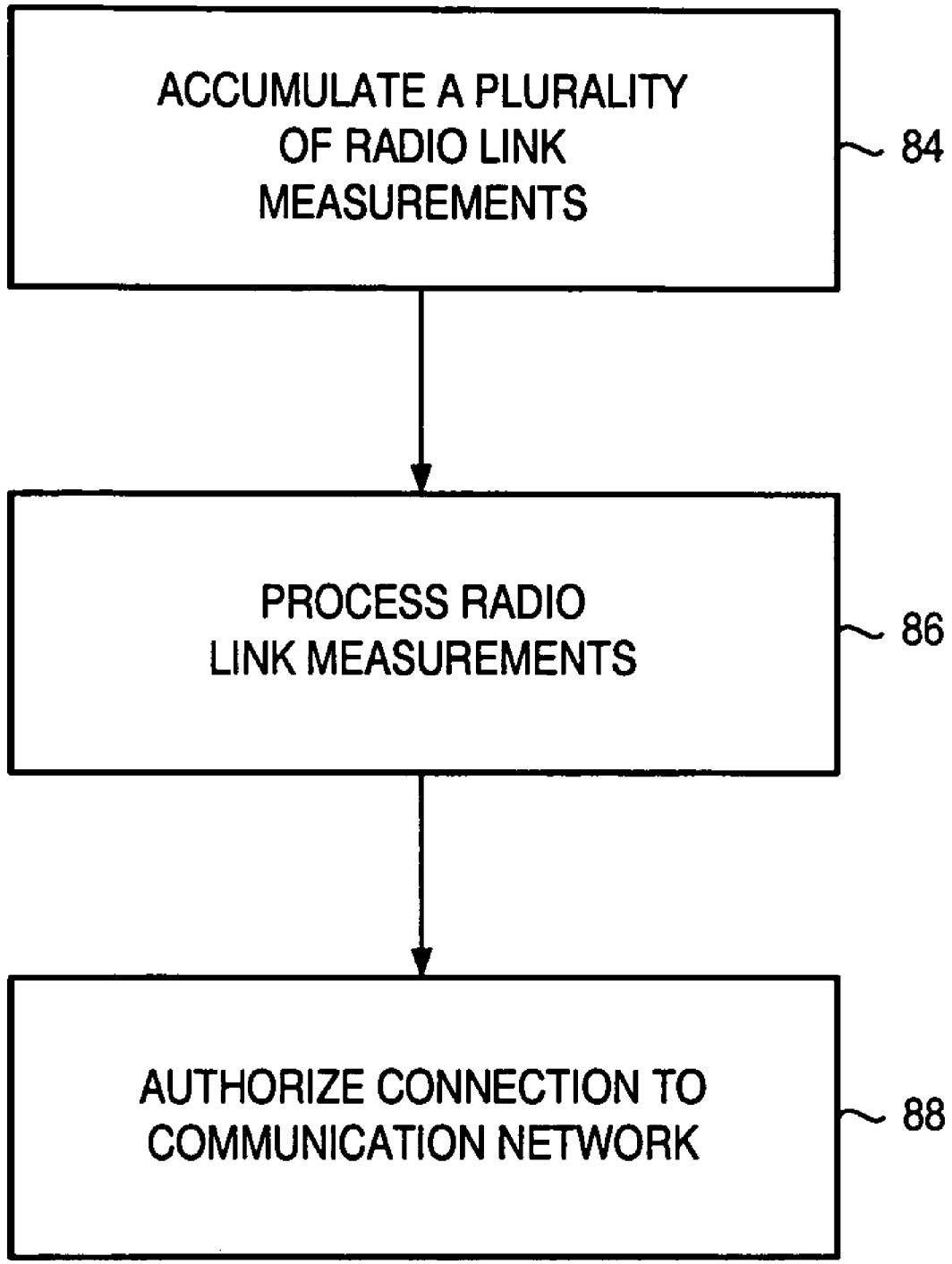
FIG. 4 illustrates a method flow diagram listing the method of operation of an embodiment of the present invention.

FIG. 4 illustrates a method flow diagram, shown generally at 82, representative of the method of operation of an embodiment of the present invention. The method is for selectably authorizing connection of a mobile station to a communication network.

First, and as indicated by the block 84, a plurality of radio link measurements are accumulated at selected time intervals. Then, and as indicated by the block 86, the plurality of radio link measurements are processed.

Thereafter, and as indicated by the block 88, the connection to the communication network is authorized if the measurements achieve selected criteria.

By better managing the radio frequency uncertainty, improved decisions are made as to whether to permit a mobile station to become attached to a communication network.

The previous descriptions are of preferred examples for implementing the invention, and the scope of the invention should not necessarily be limited by this description. The scope of the present invention is defined by the following claims.

What is claimed is:

1. Apparatus for a mobile station selectably connectable in communication connectivity with an available communication network not in present communication connectivity with the mobile station, said apparatus comprising:

a signal performance metric identifier embodied at the mobile station configured to receive an indication of a receive signal transmitted by the available communication network during at least a first time period;

a rate of change calculator adapted to receive a representation of the indication received by said signal performance metric identifier, said rate of change calculator configured to calculate a rate of change of the representation;

an average calculator configured to receive values representative of the indications received by said signal performance metric identifier, each of said indications having a respective weight assigned thereto, and said average calculator being configured to calculate a weighted average value of the indications received by said signal performance identifier; and a connector authorizer configured to receive an indication of calculations made by said rate of change calculator and said average calculator, said connector authorizer configured selectably to authorize connection of the mobile station to the available communication network responsive to the rate of change being a positive value and the weighted average value being beyond a selected level.

2. The apparatus of claim 1 wherein the indication received by said signal performance metric identifier comprises indications of the receive signal transmitted by the communication network during a plurality of time periods.

3. The apparatus of claim 2 wherein the indications comprise an indication of the receive signal for each of the plurality of time periods.

4. The apparatus of claim 3 wherein the plurality of time periods comprise successive time periods and wherein the average value calculated by said average calculator is based upon indications received by said signal performance metric identifier during a selected number of time periods of the plurality of time periods.

5. The apparatus of claim 3 wherein the average value calculated by said average calculator comprises an arithmetic average.

6. The apparatus of claim 2 wherein said rate of change calculator is further adapted to calculate the rate of change for each indication received by said signal performance metric identifier during a selected number of time periods of the plurality of time periods.

7. The apparatus of claim 6 wherein the rate of change calculated by said change calculator is calculated by determining differences in values of the indications received at said signal performance metric identifier at successive time periods of the selected number of time periods of the plurality of time periods.

8. The apparatus of claim 6 wherein the selected level beyond which the average value required by said connector authorizer to authorize connection to the communication network comprises at least a minimum level.

9. The apparatus of claim 1 wherein the indication of the receive signal to which said signal performance metric identifier is adapted to receive comprises a signal quality indicia.

10. A method at a mobile station for selectably authorizing connection of a mobile station to an available communication network not in present communication connectivity with the mobile station, said method comprising the operations of:

receiving indications, at the mobile station, of a receive signal transmitted by the available communication network during at least a first time period;

calculating rates of change representative of the indications received during said receiving;

calculating weighted average values of the indications received during said receiving, each of the indications having a respective weight assigned thereto; and authorizing the connection of the mobile station to the available communication network responsive to the rate of change being a positive value and the weighted average value being beyond a selected level.

11. The method of claim 10 wherein the indications of the receive signal comprise signal quality measurements.

12. The method of claim 10 wherein the authorizing the connection of the mobile station further comprises said authorizing being responsive to the rate of change being a positive value beyond a selected threshold.

* * * * *